United States Patent [19]

Milliman

[11] Patent Number: 5,031,568
[45] Date of Patent: Jul. 16, 1991

[54] TAPERED DIE ASSEMBLY AND ELEMENTS THEREOF

[76] Inventor: James A. Milliman, 16 Preston St., Camden, N.Y. 13316

[21] Appl. No.: 429,008

[22] Filed: Oct. 30, 1989

[51] Int. Cl.⁵ ............................................. B05C 5/00
[52] U.S. Cl. .................... 425/113; 118/405; 118/419; 118/420
[58] Field of Search ................ 118/405, 419, 420; 425/113

[56] References Cited

U.S. PATENT DOCUMENTS

| | | | |
|---|---|---|---|
| 3,752,614 | 6/1973 | Bremer | 425/113 |
| 3,960,530 | 6/1976 | Iyengar | 118/405 |
| 4,165,957 | 8/1979 | Kertscher | 425/113 |
| 4,493,747 | 1/1985 | Kanotz et al. | 425/113 |
| 4,505,222 | 3/1985 | Holt et al. | 118/405 |
| 4,690,627 | 9/1987 | Sebille | 425/113 |

Primary Examiner—Richard Bueker
Assistant Examiner—George A. Goudreau
Attorney, Agent, or Firm—Charles S. McGuire

[57] ABSTRACT

There is provided cross-head type die apparatus for applying a substantially concentric insulating layer to a conductor passing therethrough. Die assembly elements of novel structural combination are disposed within the substantially cylindrical cross-head such that they are in axial alignment with each other and the cross-head. In particular, a die insert or die tip has a front portion which tapers inwardly to substantially a point and includes an outlet orifice to guide the conductor along a passline towards a die orifice. A flow guide has a respective internal surface which tapers rearwardly to form a die orifice on its front surface. Cooperatively tapered surfaces securely fit the flow guide and the die tip within the cross-head axial bore such that a space is formed between the internally tapered surface of the flow guide and the front portion of the die tip. The die orifice and the outlet orifice of the die tip are axially aligned due to their respectively tapered fits within the cross-head. As the conductor is fed from the outlet orifice, injected plastic, which has flowed in the area between the flow guide and the die tip adheres to the conductor. The conductor concentrically passes through the die orifice of the flow guide and thus achieves a concentric layer of plastic thereon.

16 Claims, 2 Drawing Sheets

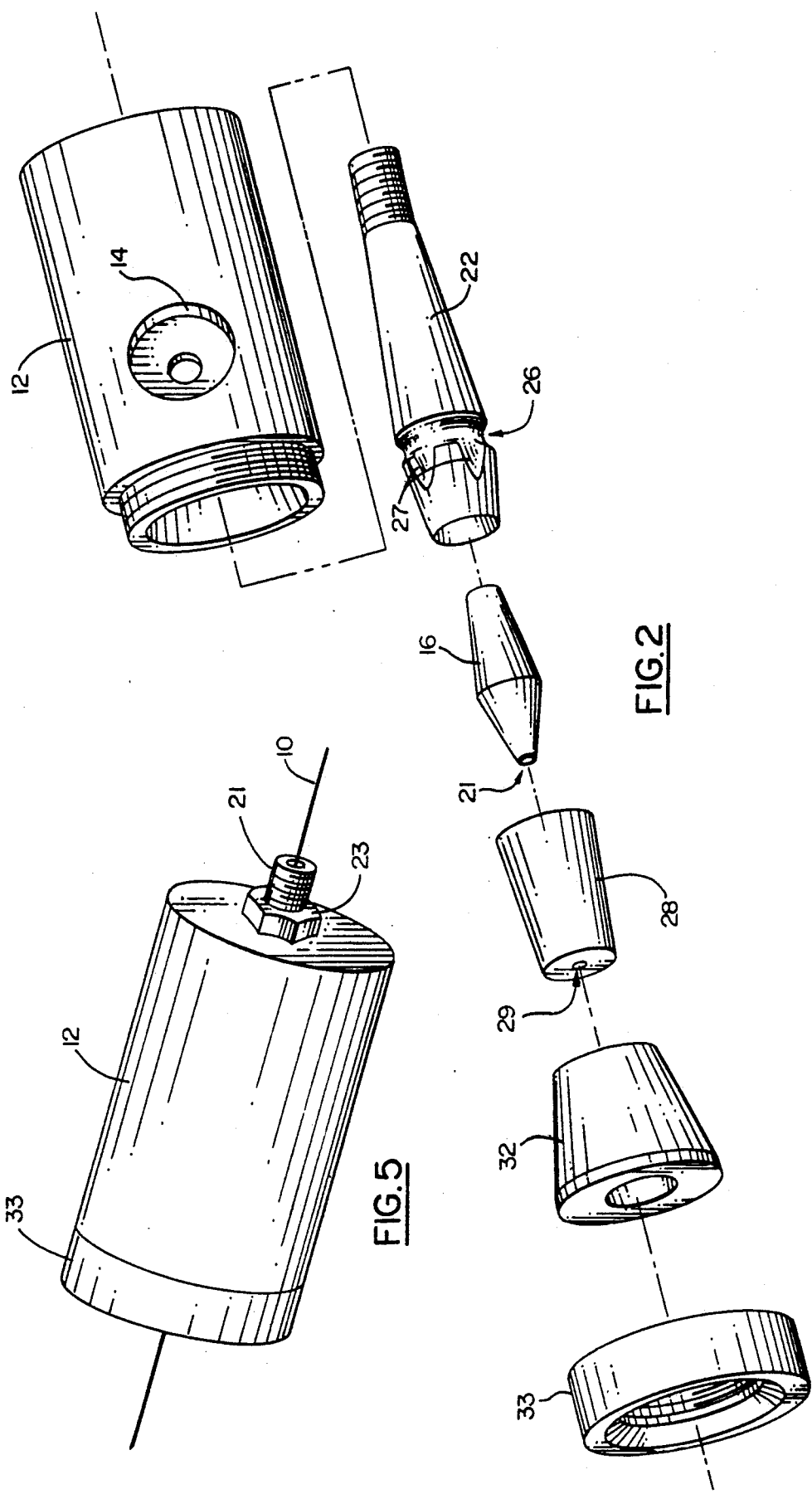

TAPERED DIE ASSEMBLY AND ELEMENTS THEREOF

BACKGROUND OF THE INVENTION

This invention relates to die apparatus which includes novel means for the concentric alignment of a plurality of spaced bores or orifices in separate elements of a die assembly, and to novel configurations of certain elements of the assembly. The invention is disclosed in an embodiment intended for applying a plastic insulating layer to an electrical wire. In the art of applying an insulating layer to a conductor wire, it is common practice to pass the wire through a die apparatus while injecting molten plastic into the die cavity. During the process, it is desirable to keep the wire concentrically aligned with the die orifice to achieve a concentric and uniform insulating layer of plastic upon the wire. This is usually done by passing the wire through a die insert upstream from the die orifice where the molten plastic is applied to the wire. To achieve a properly coated wire, the die insert must be positioned such that the wire is in constant axial alignment with the die orifice.

Die apparatus to date, of which the present inventor is aware, include cylindrically shaped elements fit within one another to achieve proper positioning of the conductor passing therethrough. Since, as is generally known to those skilled in the art, only very slight tolerances are permissible in producing an insulating layer of uniform thickness required for electrical conductor wire, the cylindrical-fit approach has proven very costly to implement. Applicant has found that each of the cylindrical elements must be finely machined to the strictest of tolerances to achieve the proper fitting and alignment of the die insert within the head assembly.

A principal object of the present invention is to provide an assembly of die elements having novel and improved means for ensuring precise axial alignment of a plurality of spaced orifices in separate elements of the assembly.

Another object is to provide die elements of novel configuration for use in a die assembly wherein a layer of molten plastic is applied to an electrical conductor as the latter travels through the assembly.

A further, more specific object is to provide a die apparatus which uses tapered, as opposed to cylindrical, elements to align conductor wire with a die orifice to achieve a proper coating of an insulating layer upon the conductor wire.

It is another object of the present invention to provide a die apparatus of the cross-head type for applying an insulating layer of plastic upon a conductor in which the die insert is easily mounted for axial alignment within the cross head.

It is a further object of the present invention to provide a tapered die apparatus for applying an insulating layer to a conductor wire which is simple in design and assembly yet achieves very satisfactory results.

Other objects will in part be obvious and in part appear hereinafter.

SUMMARY OF THE INVENTION

The invention is disclosed in the context of die apparatus of the cross-head type for applying an insulating layer of plastic to a conductor wire in the use of which substantial concentricity of the conductor within the layer is achieved.

In the preferred embodiment, a cylindrical cross-head having a through axial bore, a radial opening communicating with the axial bore, and a donut-shaped, removable cover is provided. An assembly of elements is securely fit within the axial bore of the cross-head. In the disclosed embodiment, four such elements are provided, termed a die tip, tip holder, flow guide (which includes the die orifice) and die holder. Axial alignment of the assembly elements with each other and the cross-head is achieved through respective, mating tapered surfaces of the elements and the internal surface of the cross-head axial bore. Secure fits of one element within another results from cooperative machining of the elements, i.e, the same taper bar on the lathe is used to machine the elements which have respectively mating, tapered surfaces. For purposes of orientation, the die assembly elements will be described as having back and front portions where the conductor enters and exits an element, respectively.

The die tip has a through axial bore of uniform diameter, slightly larger than the conductor, for passage of the conductor along a passline towards the die orifice of the apparatus. The die tip is held in place at its back, tapered portion by an elongated tip holder. The tip holder also has a through axial bore, the front portion having an internal, mating taper to securely receive the back tapered portion of the die tip. The external back portion of the tip holder tapers rearwardly and engages with the respectively mated taper of the back, interior surface of the cross-head axial bore. The back end of the holder extends out of the back end of the cross-head axial bore to receive bare conductor wire, the opposite, front portion of the tip holder recieving the die tip's back end and holding it in axial alignment with the cross-head via the mated tapering fit of the die tip within the holder, and of the holder within the cross-head axial bore.

A continuous, circumferential groove encircles the exterior surface of the tip holder at a point where the radial opening in the cross-head communicates with the axial bore of the cross-head when the tip holder is securely mounted therein. The groove serves as a flow divider when molten plastic is injected into the radial opening and, together with axial grooves, distributes the liquid plastic evenly about the die assembly elements in the area around and forward of the die tip.

The flow guide has an external surface defining a truncated cone, with the smaller end closed and the larger end open to an internal surface which tapers inwardly toward a die orifice through the center of the smaller end. The tapered, external surface of the flow guide mates with an internal surface of like taper in the die holder, so called because the flow guide contains the die orifice through which the conductor passes as the layer of molten plastic is applied thereto. The flow guide also has a tapered external surface which mates with a like tapered surface in the frontmost portion of the cross-head axial bore. A threaded collar holds the die holder in place on the front of the cross-head. The front end of the die tip tapers inwardly to the outlet end of the die tip bore and extends into the back end of the flow guide, in spaced relation to the tapered, internal surface thereof. The molten plastic flows into the cavity between the die tip and flow guide and is deposited in a layer of substantially uniform thickness on the conductor as the latter passes through the die orifice in the front of the flow guide. The conductor remains coaxially aligned with the die orifice due to the precise alignment of the axial bore of the die tip with the die orifice provided by the mating fit of the tapered surfaces of the die tip and tip holder in the back portion the cross-head axial bore, and the like fit of the tapered surfaces of the flow guide, die holder and front portion of the cross-head axial bore.

BRIEF DESCRIPTION OF THE DRAWINGS

FIG. 2 is an exploded, perspective view of the elements of FIG. 1;

FIG. 5 is a perspective view showing the opposite end of the cross-head of FIG. 4.

DETAILED DESCRIPTION

Figure 1:
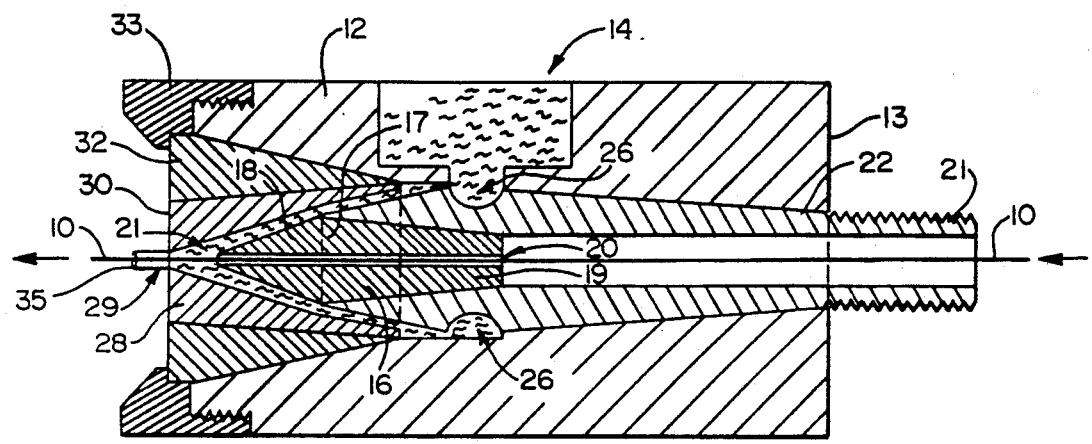
FIG. 1 is a side elevational view of the elements in fully assembled relation, in cross-section through the vertical centerline.

Referring now to the drawings, there is seen in FIG. 1 die apparatus of the cross-head type in the operation of which a concentric layer of insulating plastic is disposed upon a conductor wire 10 passing therethrough.

Cylindrical cross-head 12 includes a through axial bore providing an internal cavity adapted to receive the die assembly elements of the invention. Also included is radial bore 14, which communicates with the internal cavity of cross-head 12 such that molten plastic may be injected therein.

Disposed within cross-head 12 are die assembly elements which are of novel structural combination to achieve axial alignment of wire 10 within cross-head 12 and concentric alignment with die orifice 29. A die insert or "die tip" 16, having a through axial bore with inlet (20) and outlet (21) ends, is provided to guide conductor 10 through cross-head 12. The die tip bore is of uniform cross section, slightly larger (e.g., 0.002") in diameter than conductor 10. Die tip 16 has front and back portions meeting at a point of maximum diameter 17, front portion 18 tapering inwardly and forwardly to substantially a point, and back portion 19 tapering inwardly and rearwardly at a smaller angle than front portion 17, terminating at a circular end.

Tip holder 22 is concentrically positioned within the axial bore of cross-head 12 by a rearwardly tapered length of its external surface area engaging with a like-tapered, internal surface area of cross-head 12 such that holder 22 is in axial alignment with the internal bore of cross-head 12. Elongated tip holder 22 includes a through axial bore, its front end having the same diameter as the largest diameter 17 of die tip 16, the front portion of its internal bore tapering inwardly and rearwardly such that the front portion of holder 22 may receive and securely hold the like-tapered, back portion 19 of die tip 16 and hold it in axial alignment with holder 22 and cross-head 12. The back portion of holder 22 includes threaded portion 21 to receive securing nut 23, external of cross-head 12, as seen in FIGS. 1 and 5. Tip holder 22 includes peripheral groove 26 and a plurality of axially extending grooves 27 (FIG. 2) to serve as a flow divider to evenly distribute molten plastic, which has been injected into radial opening 14, about the front portion of the cross head axial bore.

Figure 3A:
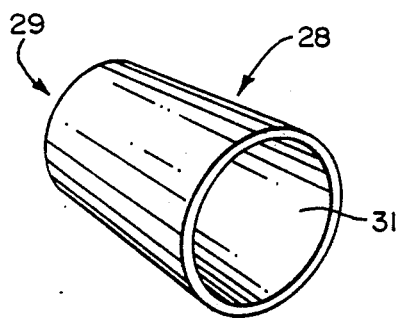
FIG. 3a is a perspective view of the flow guide element of the apparatus, taken from the back end.
Figure 3B:
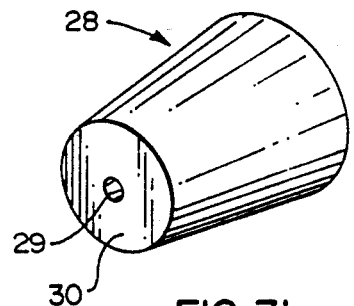
FIG. 3b is a perspective view of the flow guide of FIG. 3a taken from the front end.
Figure 4:
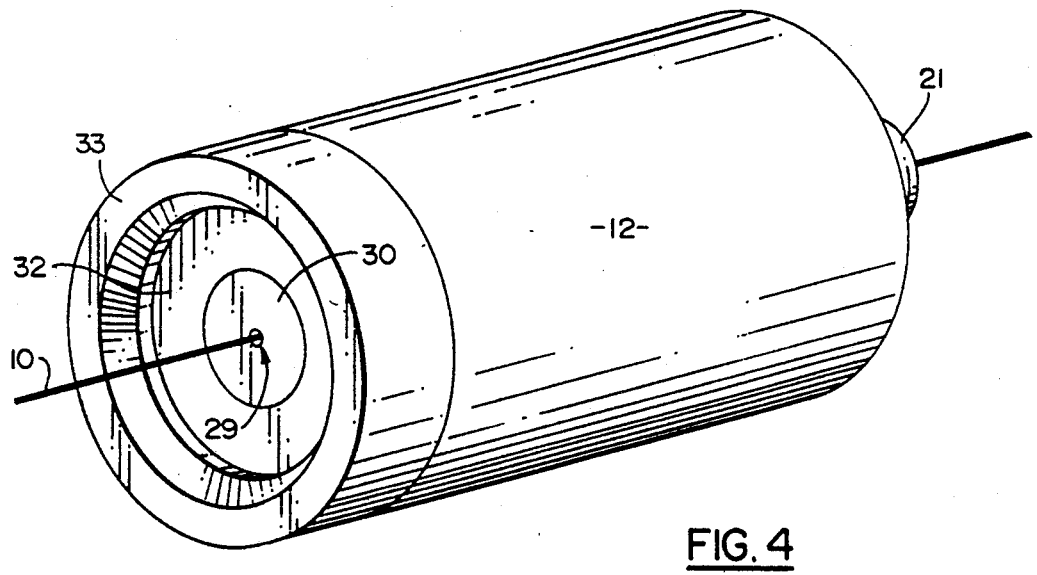
FIG. 4 is a perspective view of the cross-head element of the apparatus with the die assembly elements engaged therein.

Flow guide 28, shown separately in FIGS. 3a and 3b, has an external surface of truncated, conical shaped with a closed front end 30 having die orifice 29 extending through the center thereof. As seen in FIG. 1, the tapered, external surface of flow guide 28 is engaged with a like-tapered, internal surface of die holder 32, the latter also having a tapered external surface which is received in a like-tapered internal surface at the front end of the cross-head axial bore. Threaded collar 33 maintains die holder 32 and flow guide 28 in place on cross-head 12. Flow guide 28 is open at its back end and defines an internal surface 31 tapering inwardly from the open end to die orifice 29. The mating, tapered surfaces of the front portion of the cross-head axial bore with die holder 32, and of the latter with flow guide 28 provide precise axial alignment of die orifice 29 with the central axis of the axial bore in cross-head 12, and thus with the axial bore of die tip 16.

As seen in FIG. 1, the relative configurations and dimensions of the elements are such that, when fully assembled, the front portions of die tip 16 and tip holder 22 extend into the open end of flow guide 28, and are spaced from internal surface 31 thereof to define a cavity for the flow of molten plastic. That is, molten plastic injected into cross-head 12 through radial bore 14 is distributed by grooves 26 and 27 in tip holder 22 about the cavity within the cross-head axial bore defined by the opposing, spaced surfaces of the flow guide and the combined front portions of the die tip and holder. As conductor 10 exits die orifice 29, a layer 35 of plastic is deposited thereon, and hardens to form the desired insulting cover on the conductor. Layer 35 is of essentially uniform thickness, i.e., conductor 10 is substantially coaxially centered in the insulating layer, due to the precise coaxial alignment of the conductor with die orifice 29 provided by the cooperative fit of the tapered surfaces of the elements of the die assembly.

The diameter of die orifice 29 is substantially equal to the desired diameter of the insulating layer 35, i.e., 0.020" larger than the diameter of conductor 10. As previously mentioned, the diameter of the axial bore in die tip 16 is only slightly larger, e.g., '002" than the diameter of the conductor being coated. Thus, the disclosed embodiment may be readily adapted to operated upon conductors of different diameter, and/or to provide insulating layers of different diameter, by replacing die tip 16 and/or flow guide 28 with like elements having respective axial bores and/or die orifices of different diameters. It is contemplated that a set of die tips and flow guides providing operation over a range of conductor and insulating layer diameters will be provided with each cross-head assembly.

By way of example, the conical tapers of the mating elements may be formed at the following included angles:

1. the back portions of tip holder 22 and the axial bore of cross-head 12, 8°;
2. the front, internal surface of tip holder 22 and back, external surface of die tip 16, 5°;
3. the external surface of flow guide 28 and internal surface of die holder 32, 5°;
4. the external surface of die holder 32 and front portion of the cross-head axial bore, 30°.

Since the front portions of the external surfaces of die tip 16 and tip holder 22, as well as the internal surface 31 of flow guide 28 do not mate or directly engage with other parts, the taper angles are not as critical and may be chosen to provide the desired size and configuration of the flow cavity.

What is claimed is:

1. Apparatus for forming an insulation coating of substantially uniform thickness around an electrical conductor wire, comprising:
   a. cross-head including a through bore symmetrical about a central axis, and a radial opening communicating with said bore, said cross-head having back and front ends wherein said conductor enters and exits said cross-head, respectively, said cross-head bore having a first internal surface portion which tapers inwardly from said front end toward said back end of said cross-head bore; and
   b. die assembly elements each having respective front and back ends for disposition within said cross-head bore to guide said conductor therethrough and to establish the diameter of the coated wire, said elements comprising:
      i. a die tip having a through axial bore for passage and guidance of said conductor, a front portion of said die tip tapering conically inwardly and concentrically within said cross-head axial bore, toward said front end of said cross-head, said die tip tapering to substantially a point to form an outlet orifice at the front end of said die tip bore for exit of said conductor when passing therethrough;
      ii. a truncated, conically shaped flow guide having a through axial bore and a substantially circular, flat front end, said axial bore defining an internal surface which tapers inwardly from its back end, toward its front end, said flow guide bore extending through said flow guide front end to form a die orifice for exit of said conductor wire with said insulation coating thereon, said flow guide having an external surface tapering inwardly from said back to said front end thereof; whereby said internal and external surfaces of said flow guide taper in the same direction;
      iii. a truncated, conically shaped die holder for said flow guide having a through axial bore defining an internal surface which tapers outwardly from the front toward the back end of said die holder, and an external surface which tapers inwardly from the front toward the back end of said die holder, whereby said internal and external surfaces of said holder taper in opposite directions to one another; and
      iv. means to coaxially align said die assembly elements within said through bore of said cross-head, said aligning means including a first pair of mating surfaces which taper concentrically about said central axis of said through bore of said cross-head to position said outlet orifice of said die tip substantially concentrically within said through bore of said cross-head when said first pair of surfaces are in mating engagement with each other, said aligning means further including a second pair of mating surfaces comprising said first internal surface portion of said cross-head bore and said external surface of said die holder, and a third pair of mating surfaces comprising said internal surface of said die holder and said external surface of said flow guide, all of said first, second and third pairs of mating surfaces tapering concentrically about said central axis of said cross-head bore to position said die orifice of said flow guide substantially concentrically within said cross-head bore, whereby said die tip outlet orifice is coaxially aligned with said flow guide die orifice when said second and third pairs of surfaces are in respective mating engagement with each other.

2. The invention according to claim 1 and further including an elongated tip holder having a through bore and wherein said first pair of mating surfaces includes a conically tapered, second internal surface portion of said cross-head bore tapering outwardly from said back end toward said front end of said cross-head engaged with a complementary, conically tapered, external surface of a back portion of said tip holder 3. The invention according to claim 2 and further including a securing nut threadedly secured to a back end portion of said tip holder which extends from and external to said back end of said cross-head bore.

4. The invention according to claim 2 wherein said tip holder includes at least one peripheral groove which is aligned with said radial opening of said cross-head such that said groove evenly distributes said insulating coating about said tip holder and said die tip when said insulating coating is injected in liquid form into said radial opening of said cross-head.

5. The invention according to claim 1 wherein said cross-head is cylindrically shaped.

6. The invention according to claim 5 wherein said central axis of said through bore of said cross-head is substantially concentric with said cross-head.

7. The invention according to claim 1 and further including a ring-shaped cover which is threadably engaged with said front end of said cross-head to retain said die holder within said through bore of said cross-head.

8. The invention according to claim 2 wherein said aligning means further includes a fourth pair of mating surfaces, one being a conically tapering external surface of said die tip tapering outwardly from said back toward said front end thereof, and the other being a conically tapering internal surface of said tip holder tapering inwardly from said front toward said back end thereof, whereby a back portion of said die tip which forms said one of said fourth pair of mating surfaces is contained within said tip holder and a front portion of said die tip extends forwardly of said tip holder.

9. Apparatus for forming a plastic coating of substantially uniform thickness around an electrically conducting wire to provide an insulated conductor of predetermined diameter, said apparatus comprising: predetermined diameter, said apparatus comprising:
   a. a cross-head having a first through bore defining an internal cavity extending between back and front ends through which said wire respectively enters and exits said cross-head for travel therethrough, and a radial passageway communicating with said internal cavity for flow of molten plastic into said cavity;
   b. a die tip having a second through bore;
   c. a tip holder having conically tapering, first external surface in mating engagement with a conically tapering, first internal surface of said cross-head cavity, and a conically tapering, second internal surface in mating engagement with a conically tapering, second external surface of said die tip, whereby said die tip is fixedly positioned with respect to said cross-head;

d. a flow guide having a third through bore defined at one end by an opening of said predetermined diameter;

e. a die holder having a conically tapering, third external surface in mating engagement with a conically tapering, third internal surface of said cross-head cavity, and a conically tapering, fourth internal surface in mating engagement with a conically tapering, fourth external surface of said flow guide, whereby said flow guide is fixedly positioned with respect to said cross-head and thereby to said tip holder with said second and third bores axially aligned; and f. means releasably retaining said tip holder and said die holder in fixedly assembled relation with said cross-head with said die tip and said flow guide in spaced relation to define an annular flow passage communicating with said radial passageway and with said flow guide opening.

10. The apparatus of claim 9 wherein said third external and internal mating surfaces of said die holder and said cross-head cavity, respectively, taper inwardly from the ends thereof nearest said cross-head front end toward the ends thereof nearest said cross-head back end.

11. The apparatus of claim 9 wherein said fourth internal and external mating surfaces of said die holder and said flow guide, respectively, taper outwardly from the ends thereof nearest said cross-head front end toward the ends thereof nearest said cross-head back end.

12. The apparatus of claim 11 wherein said releasable retaining means comprise first and second threaded members respectively adjacent said front and back ends of said cross-head.

13. The apparatus of claim 11 wherein said tip holder includes a radial groove about the entire periphery thereof at a location in alignment with said cross-head radial passageway, whereby molten plastic introduced into said cross-head radial passageway is distributed about the periphery of said tip holder prior to flowing into said flow passage.

14. A die assembly of the cross-head type for applying a plastic coating to a continuous filament as it is drawn along a predetermined axis into a back end and out of a front end of said assembly, said assembly comprising:

a. a cross-head body having a through axial bore defining an internal cavity having a conically tapered surface portion extending from a larger diameter at one end of said cavity to a smaller diameter within said cavity, and a radial bore communicating with said cross-head bore for introduction of molten plastic therein;

b. guide means within said cavity through which said filament passes to maintain the position thereof along said predetermined axis;

c. a flow guide member having a through bore with an opening at one end through which said filament and plastic coating are drawn out of said assembly, said member having a conically tapered exterior surface extending from a smaller diameter at said one end to a larger diameter at the other end;

d. a die holder having a through bore defining a conically tapered internal surface of the same configuration as said exterior surface of said member, and a conically tapered exterior surface of the same configuration as said tapered surface portion of said cross-head cavity; and e. means for releasably retaining said die holder in fixed relation to said cross-head body with said die holder exterior surface in mating engagement with said tapered surface portion of said cross-head cavity, and said exterior surface of said member in mating engagement with said internal surface of said die holder, whereby said cross-head cavity, said member and said holder are characterized by the absence of any mutually mating, cylindrical surface.

15. The die assembly of claim 14 wherein said guide means comprises a die tip having a through bore of substantially constant diameter slightly larger than that of said filament, and further comprising means for holding said die tip within said cavity with the axis of said die tip bore coaxial with said predetermined axis.

16. The die assembly of claim 15 wherein said holding means comprises a tip holder having a through bore symmetrical about and coaxial with said predetermined axis, said tip holder bore having a conically tapered interior surface extending from a larger diameter at one end to a smaller diameter within said tip holder bore bore, said die tip having a conically tapered exterior surface of the same configuration as said tip holder interior surface, at least a portion of said die tip being positioned within said tip holder with said die tip exterior surface in mating engagement with said tip holder bore interior surface.

* * * * *